(No Model.)

E. B. MEYROWITZ.
SPECTACLES.

No. 329,474.  Patented Nov. 3, 1885.

Witnesses
Ed. A. Newman.
Al. C. Newman.

Inventor
Emil B. Meyrowitz,
By his Attorney

United States Patent Office.

EMIL B. MEYROWITZ, OF RIDGEFIELD, NEW JERSEY.

SPECTACLES.

SPECIFICATION forming part of Letters Patent No. 329,474, dated November 3, 1885.

Application filed May 5, 1885. Serial No. 164,474. (No model.)

*To all whom it may concern:*

Be it known that I, EMIL B. MEYROWITZ, a citizen of the United States, residing at Ridgefield, in the State of New Jersey, have invented a new and useful Improvement in Spectacles, of which the following is a specification.

This invention relates to that class of improvements in spectacles which are designed to prevent the "bridge" from cutting into the nose of the wearer, and to facilitate supporting the lenses in proper relation to the wearer's eyes.

The present invention consists in a novel attachment for ordinary spectacle-frames, whereby the nose is readily fitted and protected, and the support of the lenses can be properly modified to suit the wearer, and at the same time the bridge may be rigid or hard-tempered, so as to be incapable of modification by bending, as it should be to prevent accidental disarrangement of the lenses in handling the spectacles.

A sheet of drawings accompanies this specification as part thereof.

Figure 1:
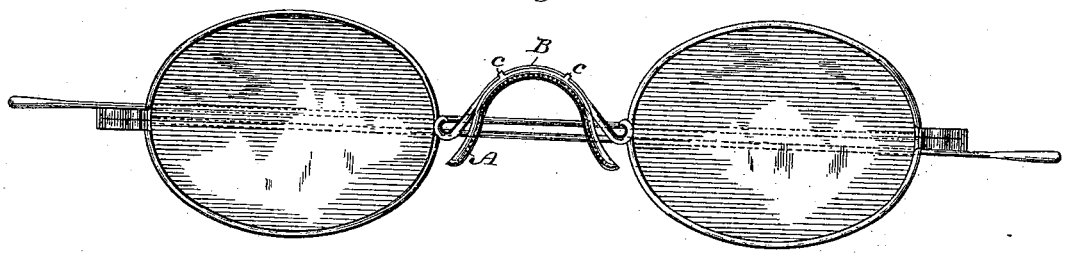
Figure 2:
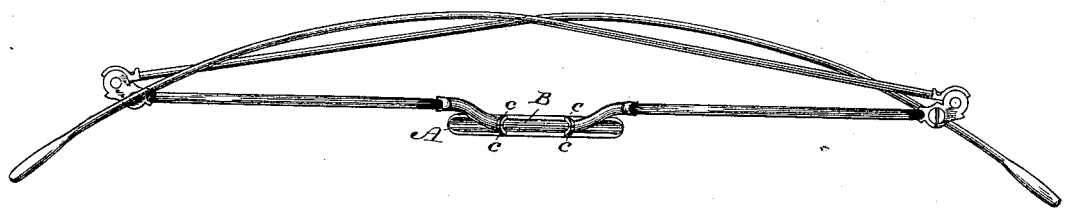
Figure 3:
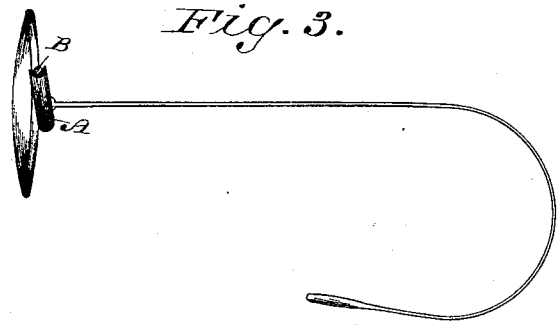
Figure 4:
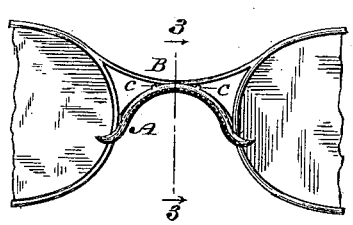

Figure 1 of these drawings is a front view of a folded pair of spectacles provided with my attachment. Fig. 2 is an upper edge view thereof. Fig. 3 represents a cross-section of the attachment applied to another style of spectacles. Fig. 4 is a fragmentary back view of the latter, showing said attachment; and Fig. 5 is a perspective view of the attachment detached.

Like letters of reference indicate corresponding parts in the several figures.

Figure 5:
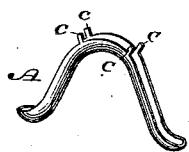

In carrying this invention into effect I produce, in suitable quantity and variety of sizes, an attachable nose-piece, A, as shown detached in Fig. 5, of pliable metal—that is to say, of soft steel, iron, gold, silver, or any suitable metal or alloy that will adapt it to be bent or shaped to the nose by the fingers, and to retain its shape with a reasonable degree of permanency.

In construction the nose-piece A is of saddle shape, and preferably concavo-convex in cross-section, its back being concave to receive the bridge B of ordinary wire-framed spectacles, and for combined lightness and rigidity, its ends, designed to remain detached, are rounded and smooth, and its back is provided with attaching fingers or clips $c$, preferably integral with the upturned edges of the nose-piece to embrace the bridge B and securely attach thereto the nose-piece A, as shown in Figs. 1 and 2 or Figs. 3 and 4. Before or after attaching the nose-piece A it is readily bent so as to fit the nose of the wearer, and is so adjusted upon the bridge B, in front of the plane of the lenses, as shown in Figs. 1 and 2, or behind such plane, as shown in Figs. 3 and 4, or in line with the lenses, as may be appropriate to insure a proper relation of the lenses to the eyes of the wearer. Apart from said nose-piece, the spectacles may be of any approved pattern and make.

Having thus described my said improvement in spectacles, I claim as my invention and desire to patent under this specification—

1. An attachable nose-piece of pliable metal, provided with pliable fingers or clips by which to attach it to the spectacles-bridge, substantially as herein specified.

2. The within-described attachable nose-piece for spectacles, constructed of pliable metal, of saddle shape, and concavo-convex in cross-section, and with attaching fingers or clips integral with its upturned edges, substantially as set forth.

3. The combination, with spectacles, of a nose-piece attached to the bridge of the frame and adjustable upon said bridge with reference to the plane of the lenses, substantially as herein specified.

E. B. MEYROWITZ.

Witnesses:
JAS. L. EWIN,
HENRY P. WELLS.